US008701800B2

(12) United States Patent
Hui et al.

(10) Patent No.: US 8,701,800 B2
(45) Date of Patent: Apr. 22, 2014

(54) SOLAR ELECTRIC VEHICLE WITH FOLDABLE BODY PANELS ON A SUN TRACKING CHASSIS

(75) Inventors: Joseph Y. Hui, Fountain Hills, AZ (US); Joseph W. Bostaph, Chandler, AZ (US); Haojun Lao, Tempe, AZ (US); Daniel A. Zindel, Mesa, AZ (US)

(73) Assignee: Monarch Power Corp, Scottsdale, AZ (US)

( * ) Notice: Subject to any disclaimer, the term of this patent is extended or adjusted under 35 U.S.C. 154(b) by 174 days.

(21) Appl. No.: 13/212,837

(22) Filed: Aug. 18, 2011

(65) Prior Publication Data
US 2012/0043143 A1 Feb. 23, 2012

Related U.S. Application Data

(60) Provisional application No. 61/401,715, filed on Aug. 18, 2010, provisional application No. 61/404,898, filed on Oct. 12, 2010.

(51) Int. Cl.
*B60K 16/00* (2006.01)
(52) U.S. Cl.
CPC . *B60K 16/00* (2013.01); *Y02T 10/90* (2013.01)
USPC .............................. 180/2.2; 180/2.1
(58) Field of Classification Search
CPC ................................ Y02T 10/90; B60K 16/00
USPC ..................................... 180/2.1, 2.2
See application file for complete search history.

(56) References Cited

U.S. PATENT DOCUMENTS

| 2,656,214 | A | * | 10/1953 | Alamagny | ............... | 296/193.01 |
| 3,943,726 | A | * | 3/1976 | Miller | ............ | 62/235.1 |
| 4,090,577 | A | * | 5/1978 | Moore | ............ | 180/243 |
| 4,141,425 | A | * | 2/1979 | Treat | ............ | 180/2.2 |
| 4,181,188 | A | * | 1/1980 | Dessert | ............ | 180/2.2 |
| 4,261,329 | A | * | 4/1981 | Walsh et al. | ............ | 126/569 |
| RE31,156 | E | * | 2/1983 | Dessert | ............ | 180/2.2 |
| 4,592,436 | A | * | 6/1986 | Tomei | ............ | 180/2.2 |
| 4,633,767 | A | * | 1/1987 | Sain | ............ | 454/92 |
| 4,663,495 | A | * | 5/1987 | Berman et al. | ............ | 136/248 |
| 4,804,140 | A | * | 2/1989 | Cantrell | ............ | 236/49.3 |
| 5,059,254 | A | * | 10/1991 | Yaba et al. | ............ | 136/251 |
| 5,489,002 | A | * | 2/1996 | Streiff | ............ | 180/65.31 |
| 5,542,203 | A | * | 8/1996 | Luoma et al. | ............ | 40/610 |

(Continued)

FOREIGN PATENT DOCUMENTS

CN 201201524 Y * 3/2009
DE 4110819 A1 9/1991

(Continued)

OTHER PUBLICATIONS

European Search Report in connection with EP Application No. 11186789.1, dated Jan. 9, 2013, 2 pages.

*Primary Examiner* — Hau Phan
*Assistant Examiner* — Jacob Meyer
(74) *Attorney, Agent, or Firm* — Robert C. Klinger

(57) ABSTRACT

A solar electric vehicle (SEV) with large foldable surface area that can be oriented towards the sun for peak generation of electricity. The surfaces of the SEV are mounted on a flexible chassis for elevation tracking, while the drive train provides azimuth tracking. The SEV also integrates the conversion of power from various sources, to various storage or power consumption devices.

22 Claims, 18 Drawing Sheets

Slanted Side View with Wings Opened

(56) References Cited

U.S. PATENT DOCUMENTS

| | | | |
|---|---|---|---|
| 5,545,261 A * | 8/1996 | Ganz et al. | 136/251 |
| 5,644,207 A * | 7/1997 | Lew et al. | 320/101 |
| 5,680,907 A * | 10/1997 | Weihe | 180/2.2 |
| 5,725,062 A * | 3/1998 | Fronek | 180/2.2 |
| 5,767,663 A * | 6/1998 | Lu | 322/12 |
| 5,806,622 A * | 9/1998 | Murphy | 180/210 |
| 5,908,077 A * | 6/1999 | Moore | 180/65.25 |
| 5,969,501 A * | 10/1999 | Glidden et al. | 320/101 |
| 5,986,429 A * | 11/1999 | Mula, Jr. | 320/101 |
| 6,021,862 A * | 2/2000 | Sharan | 180/216 |
| 6,101,750 A * | 8/2000 | Blesener et al. | 40/448 |
| 6,201,181 B1 * | 3/2001 | Azzam et al. | 136/244 |
| 6,406,090 B1 * | 6/2002 | Tolinski et al. | 296/223 |
| 6,423,894 B1 * | 7/2002 | Patz et al. | 136/244 |
| 6,439,658 B1 * | 8/2002 | Ganz et al. | 297/180.14 |
| 6,448,740 B1 * | 9/2002 | Kirkpatrick | 320/101 |
| 6,536,828 B2 * | 3/2003 | Love et al. | 296/96.19 |
| 6,586,668 B2 * | 7/2003 | Shugar et al. | 136/244 |
| 6,682,132 B1 * | 1/2004 | Hahn | 296/215 |
| 6,702,370 B2 * | 3/2004 | Shugar et al. | 296/211 |
| 6,991,051 B2 * | 1/2006 | Swindell et al. | 180/65.1 |
| 7,017,685 B2 * | 3/2006 | Schoenberg | 180/2.1 |
| 7,202,457 B2 * | 4/2007 | Janus et al. | 250/203.4 |
| 7,445,275 B2 * | 11/2008 | Woodhouse et al. | 296/211 |
| 7,469,541 B1 * | 12/2008 | Melton et al. | 60/641.1 |
| 7,492,120 B2 * | 2/2009 | Benn et al. | 320/101 |
| 7,597,388 B1 * | 10/2009 | Samuel | 296/210 |
| 7,884,569 B2 * | 2/2011 | Ward | 320/101 |
| 8,593,102 B2 * | 11/2013 | McGuire et al. | 320/101 |
| 2001/0039960 A1 * | 11/2001 | Shugar et al. | 136/244 |
| 2002/0053816 A1 * | 5/2002 | Teschner et al. | 296/211 |
| 2002/0101097 A1 * | 8/2002 | Muller | 296/211 |
| 2002/0153178 A1 * | 10/2002 | Limonius | 180/2.2 |
| 2003/0217874 A1 * | 11/2003 | Schoenberg | 180/2.2 |
| 2004/0040755 A1 * | 3/2004 | Swindell et al. | 180/2.2 |
| 2005/0279347 A1 * | 12/2005 | Mejia | 126/605 |
| 2006/0113118 A1 * | 6/2006 | Kim | 180/2.2 |
| 2006/0124827 A1 * | 6/2006 | Janus et al. | 250/203.4 |
| 2006/0213697 A1 * | 9/2006 | Sutherland | 180/2.2 |
| 2007/0107768 A1 * | 5/2007 | Romana et al. | 136/244 |
| 2007/0125417 A1 * | 6/2007 | Johanson et al. | 136/244 |
| 2007/0261896 A1 * | 11/2007 | Shaffer et al. | 180/2.2 |
| 2008/0100258 A1 * | 5/2008 | Ward | 320/101 |
| 2008/0196758 A1 * | 8/2008 | McGuire | 136/245 |
| 2009/0165841 A1 * | 7/2009 | Gunn et al. | 136/245 |
| 2009/0277699 A1 * | 11/2009 | Wan | 180/2.2 |
| 2009/0288890 A1 * | 11/2009 | Freeman | 180/2.2 |
| 2010/0109910 A1 * | 5/2010 | Fahey | 340/908 |
| 2010/0193260 A1 * | 8/2010 | Freeman | 180/2.2 |
| 2010/0193261 A1 * | 8/2010 | Freeman | 180/2.2 |
| 2011/0079166 A1 * | 4/2011 | Popa-Simil | 105/1.4 |
| 2011/0181018 A1 * | 7/2011 | Bruneau | 280/414.1 |
| 2011/0226312 A1 * | 9/2011 | Bohm et al. | 136/251 |
| 2012/0073885 A1 * | 3/2012 | Glynn | 180/2.2 |
| 2012/0197486 A1 * | 8/2012 | Elliott | 701/33.2 |
| 2012/0305052 A1 * | 12/2012 | Bruneau | 136/246 |
| 2013/0057023 A1 * | 3/2013 | Kim et al. | 296/181.1 |

FOREIGN PATENT DOCUMENTS

| | | |
|---|---|---|
| DE | 102008046798 A1 * | 3/2010 |
| DE | 102009009242 A1 | 8/2010 |
| EP | 2 559 585 A1 | 10/2011 |
| GB | 2240517 A * | 8/1991 |
| JP | 63071420 A * | 3/1988 |
| JP | 11220805 A * | 8/1999 |
| NL | 1033741 C2 | 10/2008 |
| WO | WO 2009/142650 A1 | 11/2009 |

* cited by examiner

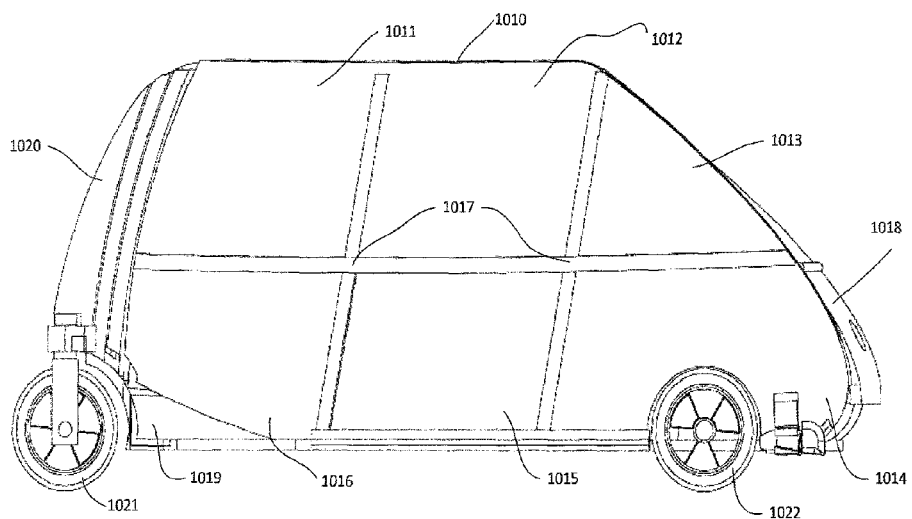
Figure 1 Side View

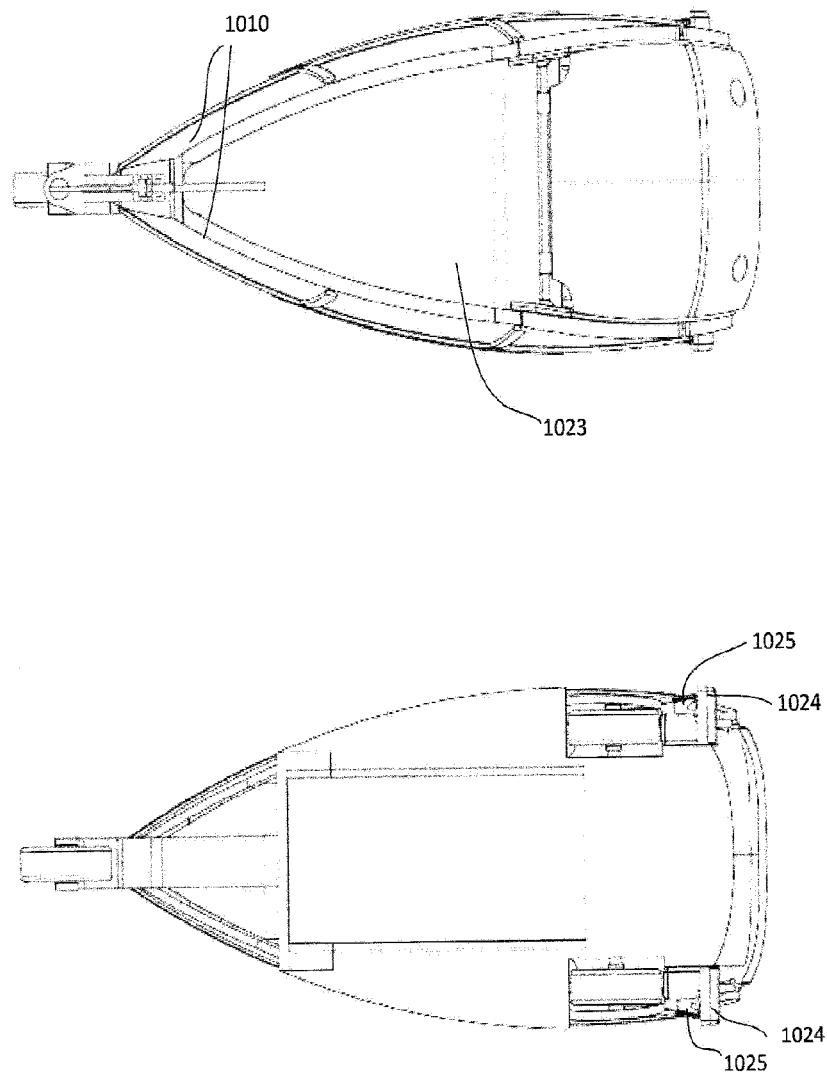
Figure 2 Top and Bottom Views

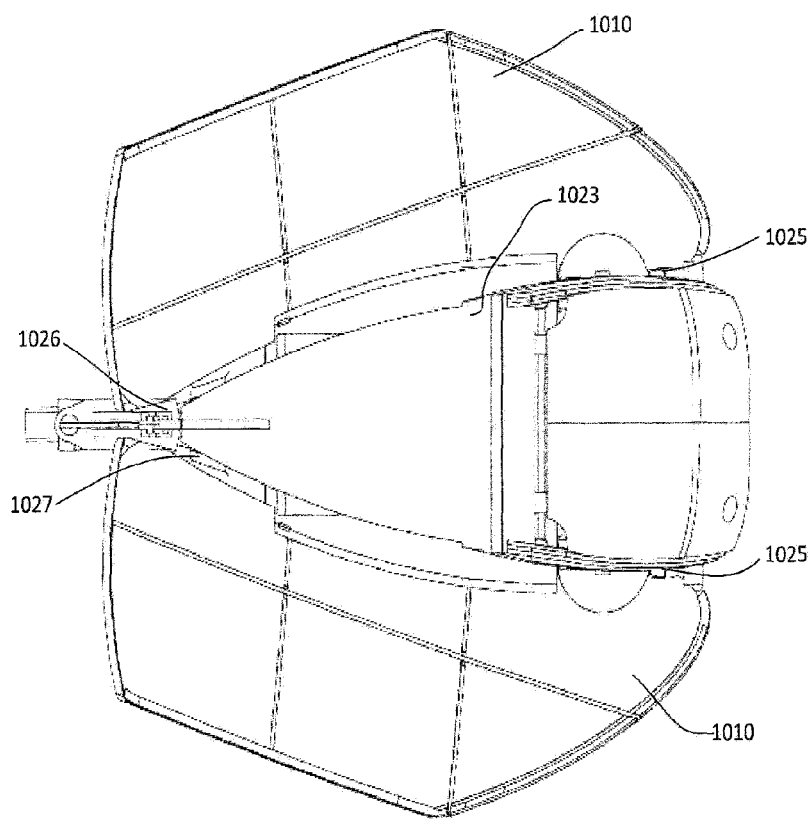
Figure 3 Top View with Wings Opened

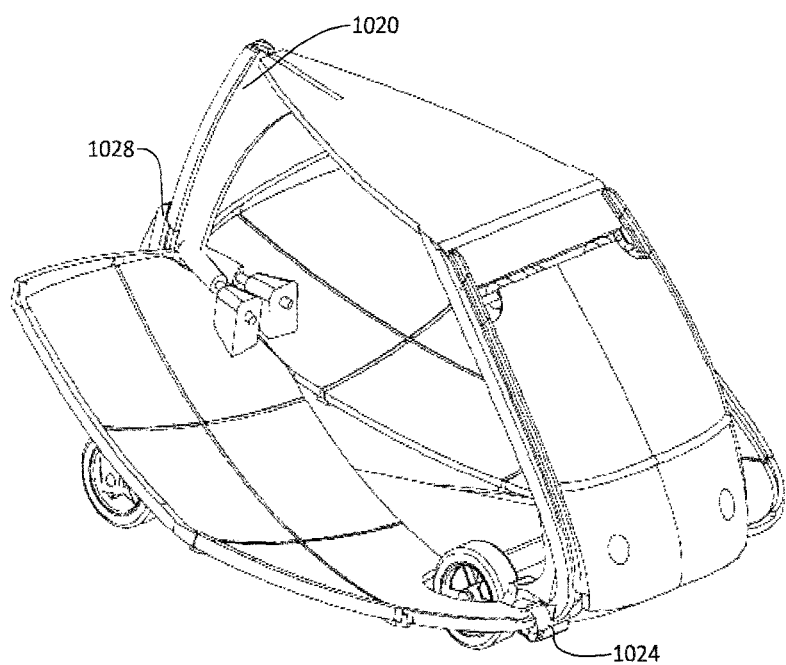
Figure 4 Slanted Side View with Wings Opened

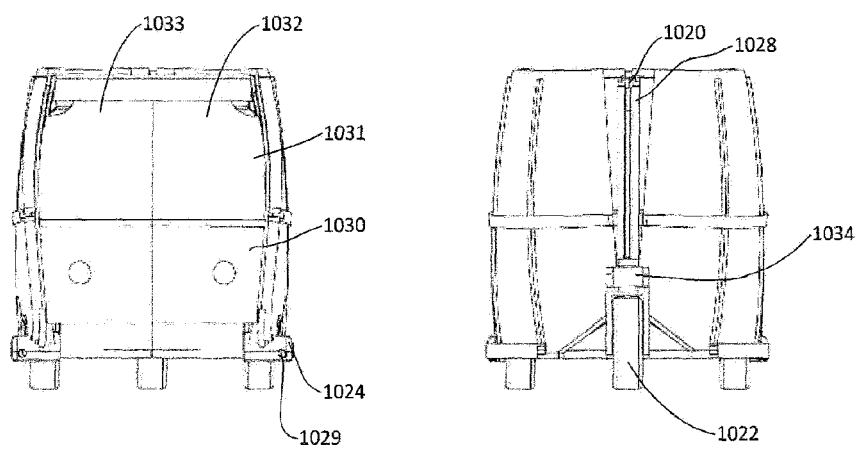
Figure 5 Front and Back View

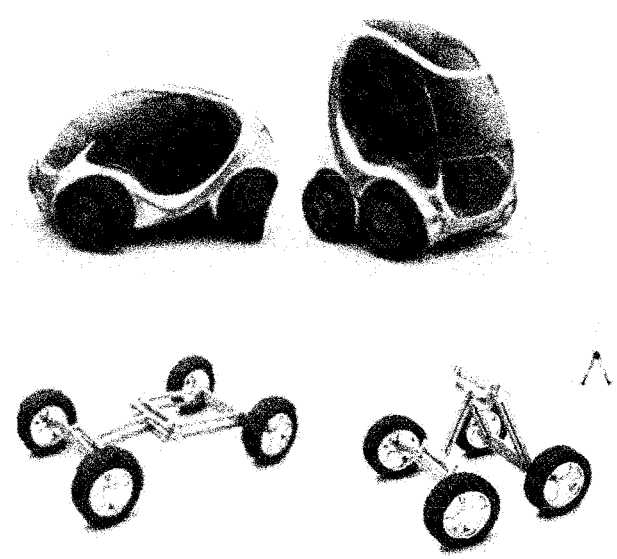
Figure 6 [Prior Art] The MIT City Car with Inverted V flexible Chassis

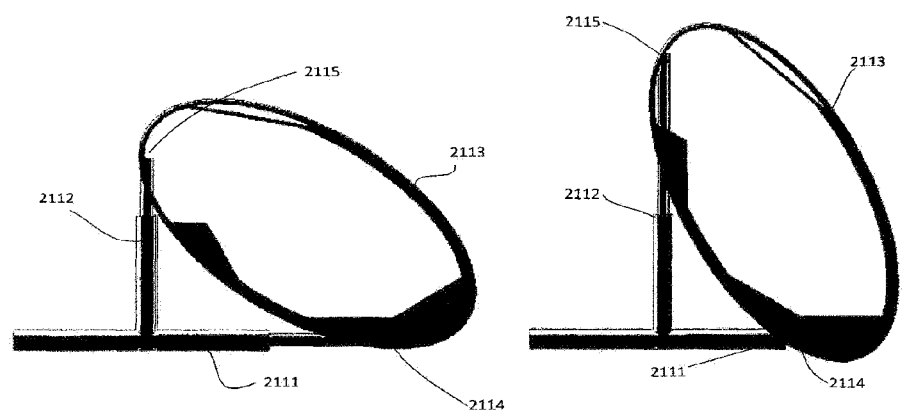
Figure 7 Flexible Chassis for Re-Orientation of the Passenger Cabin

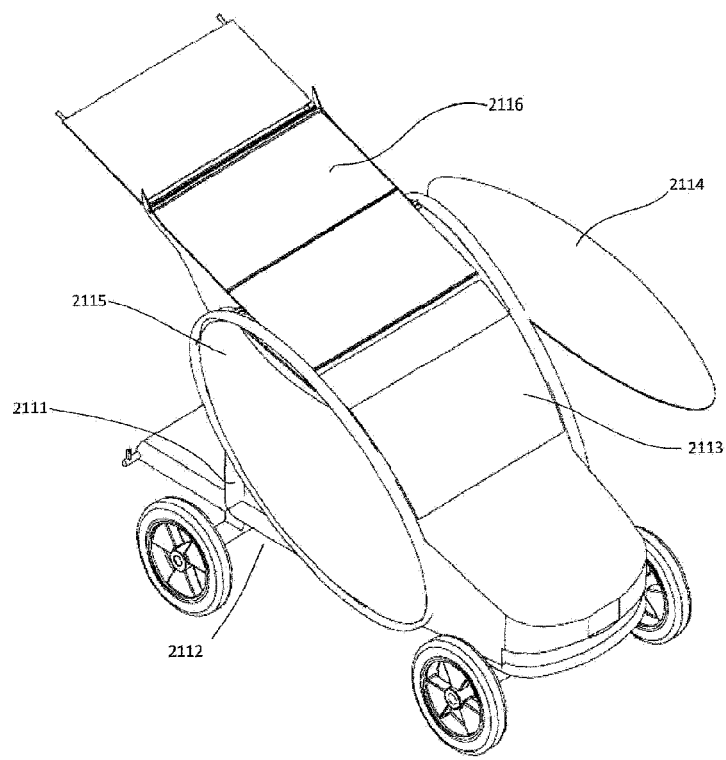
Figure 8 Early Embodiment of Monarch EV with Flexible Chassis and Foldable Sides

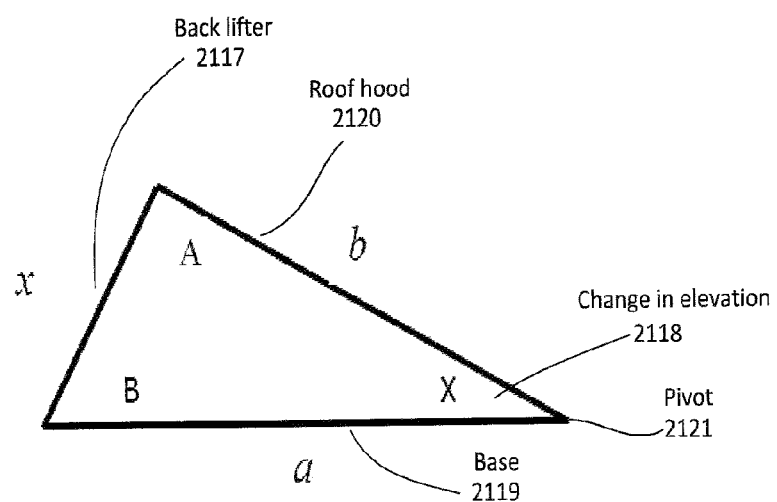
Fig 9 Changing elevation angle X associated with side of length $x$

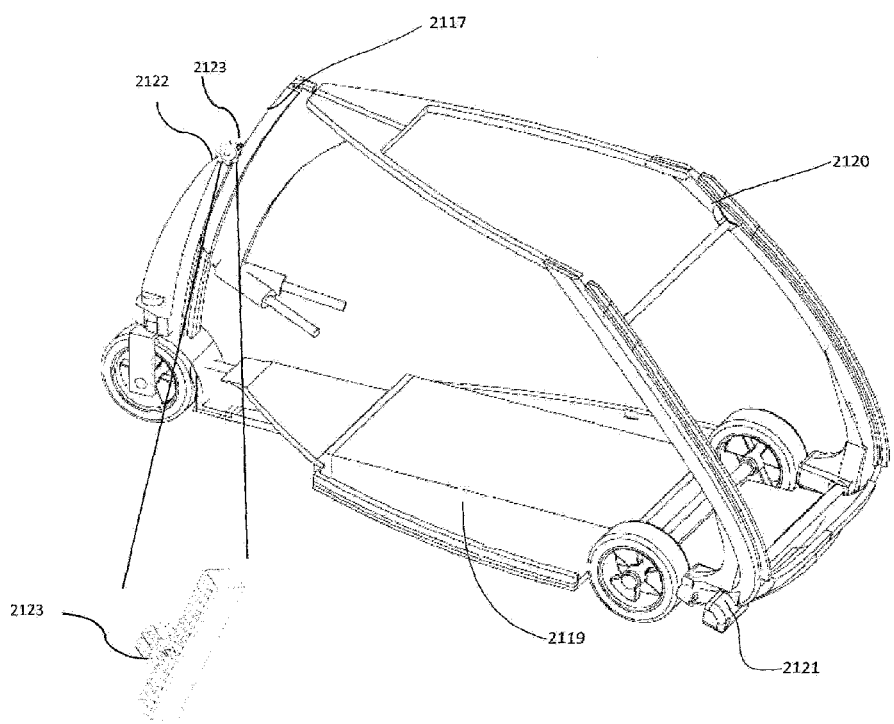
Figure 10 Monarch EV with Flexible Chassis and Foldable Sides. Insert shows a rack and pinion style gear system.

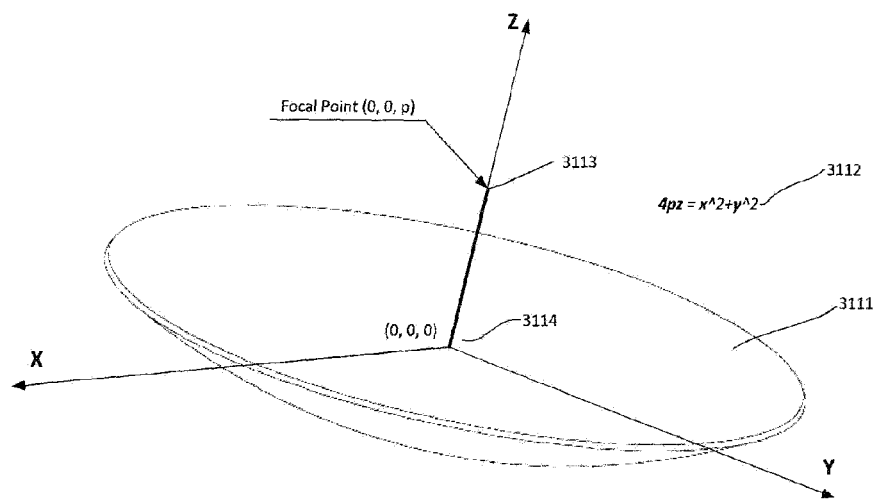
Figure 11 Parabolic dishes formed from parabola with focus length $p$

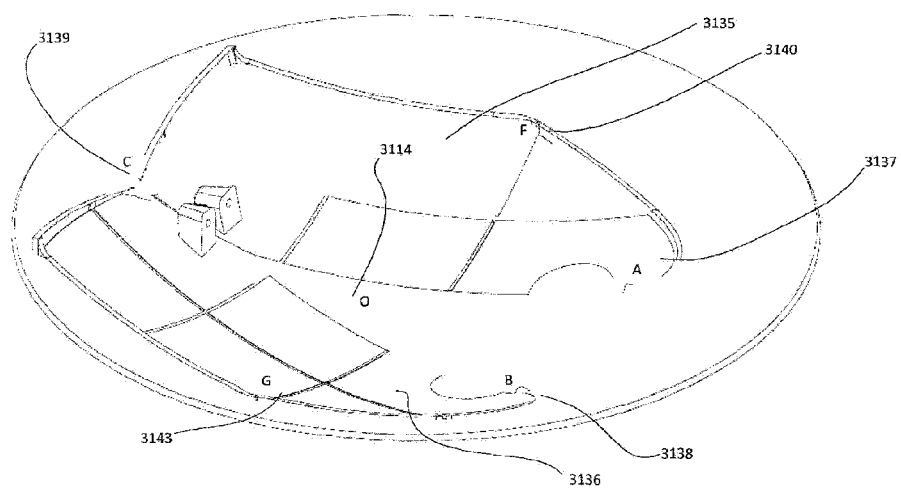
Figure 12 Incising Two Parabolic Wings onto a Single Parabolic Surface

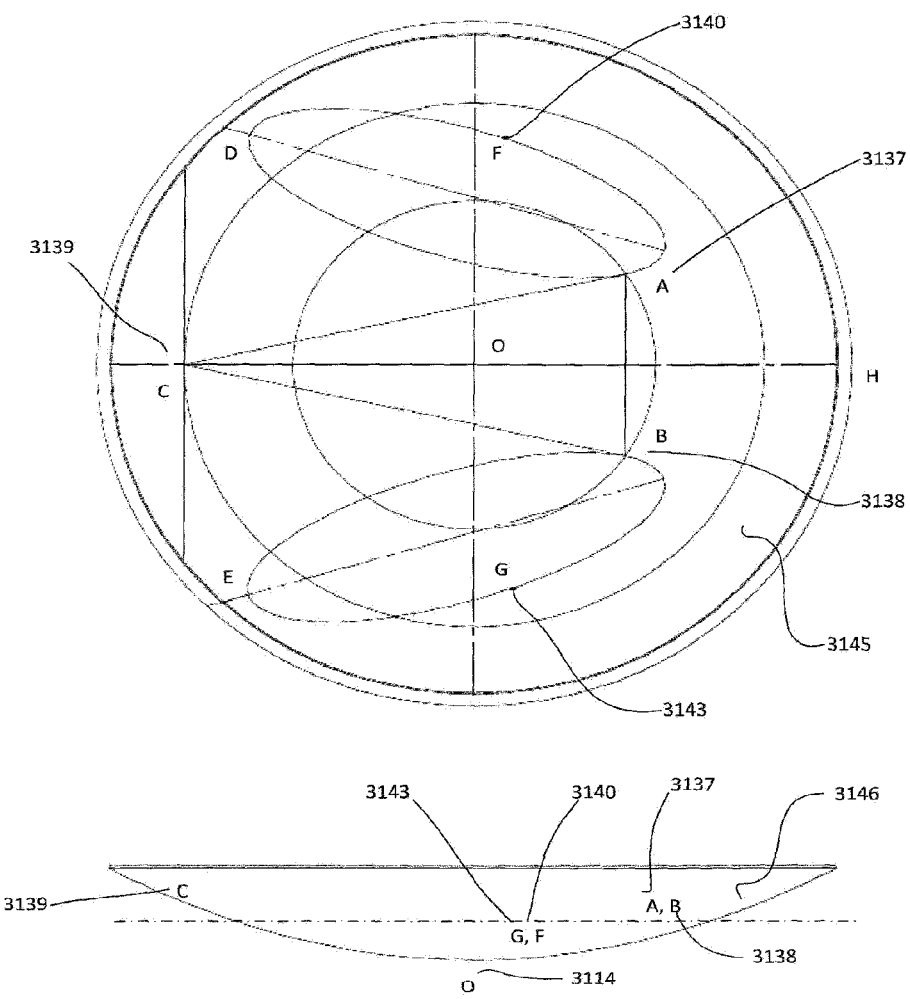
Figure 13 Process of Forming Parabolic Surface for Monarch EV

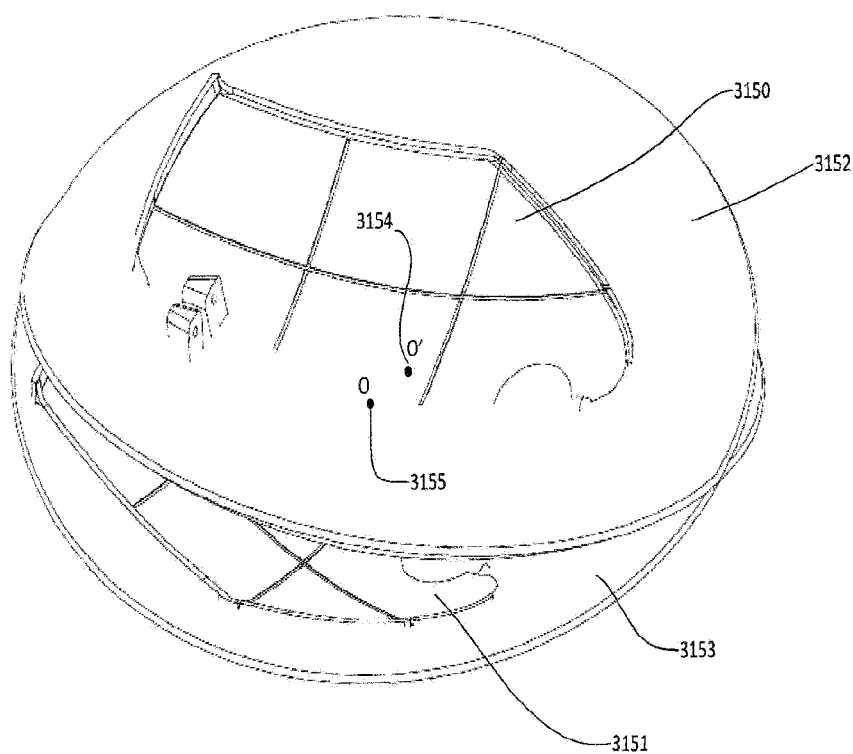
Figure 14 Incising the Left and Right Wings onto Two Parabolic Surfaces

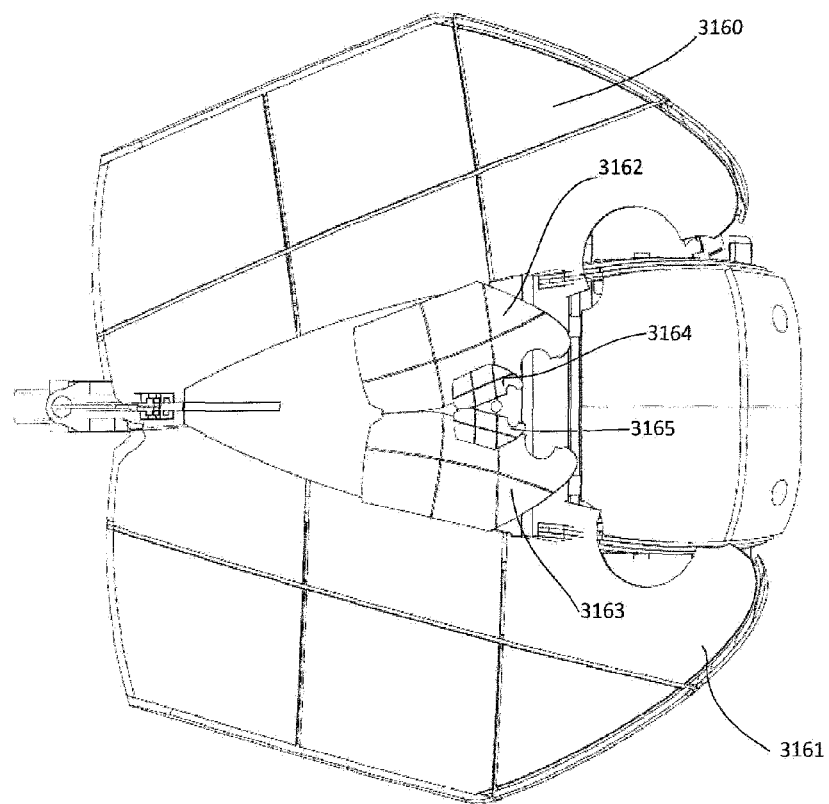
Figure 15 Solar Generation via Roof Top Panel or Second Stage Concentrator/Receiver

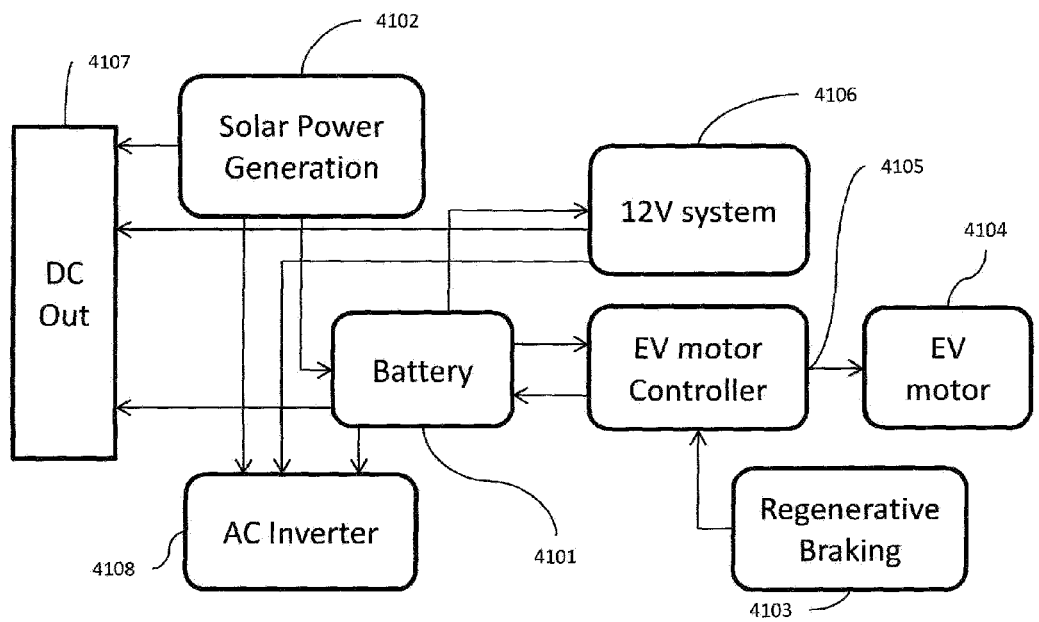
Figure 16 Diagram showing main components of EV energy/electrical system

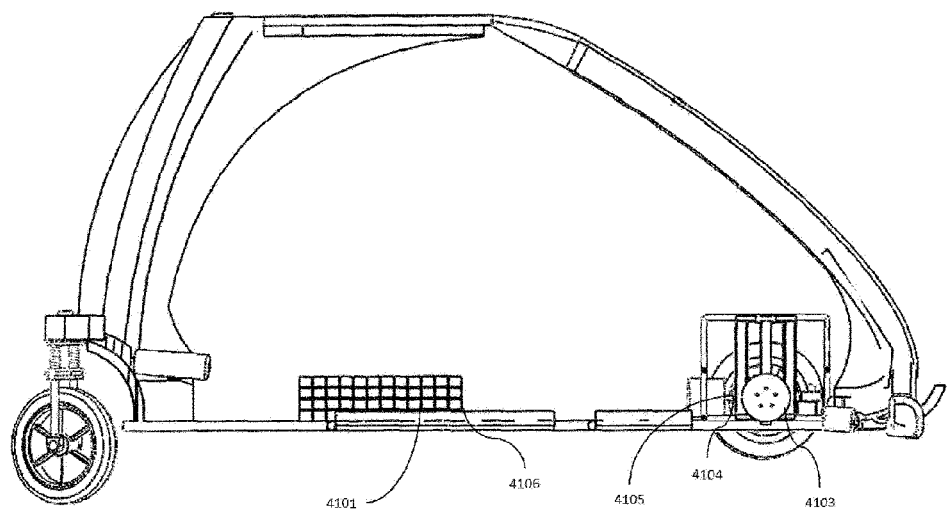
Figure 17 Electrical component locations in an EV

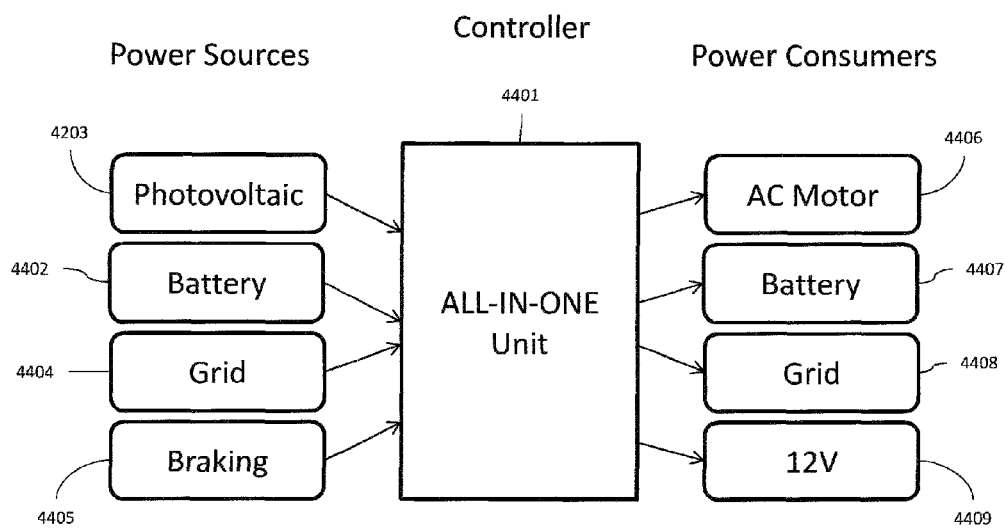
Figure 18 All-in-one Power Unit

SOLAR ELECTRIC VEHICLE WITH FOLDABLE BODY PANELS ON A SUN TRACKING CHASSIS

CLAIM OF PRIORITY

This application claims priority of U.S. Provisional Ser. No. 61/401,715 entitled "Flexible Multiple Purpose Automobile Chassis" filed Aug. 18, 2010 and U.S. Provisional Ser. No. 61/404,898 entitled "Sun Tracking Solar Concentrators Mounted on Electric Vehicles" filed Oct. 12, 2010, the teachings of each are incorporated herein by reference.

FIELD OF THE INVENTION

The present invention is generally related to vehicles, and more specifically to green vehicles including electric and solar powered vehicles.

BACKGROUND OF THE INVENTION

Electric vehicles (EV) require electrical power sources, and the most ubiquitous and convenient power source is the sun. Vehicles are most often exposed to the sun and not sheltered. However, photovoltaic (PV) electricity generation on board vehicles has so far not been effective due to several problems. First, the surface area of the vehicle is rather limited, unlike roof tops and fixed solar panel installations. Second, sun tracking on a movable platform could be difficult to orient PV generation towards the sun, even when the vehicle is parked. Third, traditional PV panels are heavy and of efficiency lower than 20%, limiting mobility and the amount of power that can be generated.

SUMMARY OF THE INVENTION

The invention achieves technical advantages as vehicle having a versatile platform and vehicle design enabling the vehicle to effectively integrate sun tracking solar electricity generation and operate from the collected electricity. A vast majority of the surface of the car can unfold for high efficiency electricity generation. The vehicle provides both azimuth solar tracking via the steering and drive train, and elevation solar tracking via a flexible chassis. The unfolded surface can directly generate power with PV panels on the surface. Lower weight thin film technologies, which to date have lower efficiency, or traditional fixed panels, can be mounted directly on the surface. Even better, the unfolded surface can concentrate solar power, for example as a parabolic mirror onto higher efficiency PV cells, e.g. triple junction gallium arsenide PV cells that have efficiency exceeding 40%. The underside of the roof of the vehicle can serve as the solar receiver for concentrated solar energy.

High degree of solar concentration may require air or liquid cooling for lowering the operating temperature of the cell for peak efficiency. Liquid cooling could be implemented, with the advantage of integrating the functions of electricity and hot water generation of concentrated solar power with the functions of electric vehicles.

This invention integrates PV and EV functions and allows dual use of components. This dual use reduces the cost of PV on an EV platform. First, the EV body is also used as a solar energy collector. Second, the controller of the EV (which converts DC power of the batteries into AC power for the AC motor) can also be used as an inverter for feeding DC solar power into the AC power grid. Third, the batteries used to power the EV can also serve to store energy generated by PV, thus serving the much desired function of grid storage. The EV is grid tied, not just for the grid to charge the batteries but also for allowing energy be fed back into the grid from the batteries. The batteries in an electric vehicle can also serve as uninterruptible power supply (UPS) for household utilities. Fourth, the drive train of the EV can be used for orienting PV cells or panels towards the sun. Fifth, the EV telematics system can also serve as part of the PV control system. Most EV on the market today monitors and manages the batteries remotely by wireless networks. PV functions, such as sun tracking, PV generation deployment, and collecting generation statistics can also be controlled remotely through the same wireless network.

The solar electric vehicle with unfolded sides bears a certain resemblance to a butterfly. The solar electric vehicle is therefore called the Monarch EV throughout the specification. The Monarch EV is also recognized as a brand for the PV-EV invention.

BRIEF DESCRIPTION OF THE DRAWINGS

The first series of FIGS. 1-5 illustrate how the Monarch EV embodies the invention.

FIG. 1 provides the side view of the Monarch EV.
FIG. 2 provides the top view.
FIG. 3 provides the top view with the wings deployed.
FIG. 4 provides the side view with wings deployed.
FIG. 5 provides the front and back view of the vehicle without deployment of the wings.

The second series of FIGS. 6-10 explain the principles of PV solar tracking via EV mobility and a sun tracking chassis.

FIG. 6 shows flexible chassis designs at MIT proposed for minimizing parking footprint of cars.
FIG. 7 shows a flexible chassis based on two perpendicular poles that can change length.
FIG. 8 shows an early embodiment of a flexible chassis with foldable solar panels on sides and top of vehicle.
FIG. 9 shows the current embodiment of flexible chassis with foldable solar panels for the Monarch EV.
FIG. 10 shows in more details the rails for sections of the lift which can be extended to lift the elevation of the vehicle.

The third series of FIGS. 11-15 explain the process and mathematics of forming the parabolic mirrors and how the sides of the EV could be designed for solar concentration.

FIG. 11 describes the analytical geometry of a parabolic surface.
FIG. 12 shows how a parabolic surface could be incised and folded to form the sides of the Monarch EV.
FIG. 13 shows an alternative implementation of the two side reflectors from 2 separate parabolic surfaces.
FIG. 14 shows the folded view of the parabolic sides and where the hinging points for solar tracking are.
FIG. 15 illustrates one embodiment of the solar receiver in relationship with the concentrating mirror.

The fourth series of FIGS. 16-18 explains power flow of energy related components of the Monarch EV and the integrated PV-EV energy conversion and storage system.

FIG. 16 delineates various energy generating, storage, and consumption components of the Monarch EV and the energy conversion devices connecting these components.
FIG. 17 places these components on the Monarch EV.
FIG. 18 shows an all-in-one energy power control unit which manages multiple input and outputs from a Monarch EV, capable of meeting all EV energy system needs as well as multiple energy outputs for auxiliary power supply and/or grid supplemental source.

DETAILED DESCRIPTION OF THE PRESENT INVENTION

In FIGS. 1-5 various perspectives of the Monarch EV are shown with same labels on the same components in these Figures. We describe the structure of the vehicle with most of the description of the design and functions explained in later sections.

In FIG. 1, we show the right side of the vehicle. The large surface of the side [1010] comprises a parabolic surface. In one implementation, the surface comprises six separate panels [1011-1016] supported by T bar framing [1017]. The front hood [1018] serves as an entrance to the vehicle. The chassis has a bottom plate [1019] providing base support, and a back lift [1020] providing back support as well as solar elevation tracking. The front wheels [1022] and a single back wheel [1021] are all steerable, for the purposes of locomotion steering as well as solar azimuth tracking.

In FIG. 2, we show the top and bottom views. The roof [1023] provides also the function of solar energy collection from the underside as sunlight is reflected from the parabolic mirrors [1010] of FIG. 1. The parabolic mirrors on the left and on the right [1010] are in the folded position without PV generation. In this implementation, the parabolic sides close the vehicle also at the back of the vehicle as they converge at the back. The roof top can also have solar panels receiving solar energy while parked, with or without solar tracking. The pivots [1024] seen from the bottom view allow the sides, which we call wings, to rotate in elevation around the pivot for tracking the elevation of the sun. The pivots [1025] allow the wings to open while the vehicle is parked so that sunlight could be collected.

In FIG. 3, we show the top view with the wings [1010] opened. In FIG. 4, we show a slanted view that indicates not only the wings opened, but also rotation of the car in elevation. The wings are opened by each wing rotating around two hinges, the front hinge [1025] and the back hinge [1026]. The back hinges can rotate as far out as allowed by the blocks [1027] which allow the wings to focus sunlight on the roof [1023]. In this focused position, the top surfaces of the wings [1010] form a single parabolic surface. When proper solar tracking is achieved as described later, the solar energy is focused on the underside of the roof [1023] for effective PV energy generation.

In FIG. 4, we show how the elevation is changed by a flexible extension of the back lift [1020]. The back lift has multiple extensions that can extend the length of the lift by pulling out an extension [1028] along inlayed rails. In one embodiment, we have two extension sections inside the back lift [1020]. The extensions [1028] facilitate rotation of the parabolic surface around the hinges [1024] in the effort to change the elevation for the purpose of tracking the elevation of the sun. Therefore the extensions [1028], when extended, form the circumference of a circle with center at the axle that connects the hinges [1024].

In FIG. 5, we show the front and back of the vehicle. From this perspective we can see the hinges [1024] and the axle for rotation [1029]. The front is covered by the front hood [1030] and the windshield [1031]. The front is split top down in the center to form the fixed driver side [1032] shield and the movable passenger side [1033] shield. The movable shield [1033] also serves as the entrance door for the vehicle either by opening on the side as a swing door, or on the top as a hatch door.

The back side of the vehicle again shows the lift [1020] with the extensions [1028] enclosed in the lift without tracking the sun. Also shown is the single back wheel [1022] which could provide additional steering for parking. The steering column [1034] allows the wheel [1022] to turn clockwise or counter-clockwise up to 90 degrees. This steering is also used for tracking the sun in its azimuth orientation during different times of the day. The three wheels together provide this azimuth axis tracking. In one embodiment, we can fix the right front wheel and let the left front wheel loose. The right front wheel is now the center of rotation. The back wheel [1022] is turned 90 degrees. When the back wheel rotates, the vehicle turns around the center of the right front wheel.

The Solar Tracking Monarch EV Chassis (FIGS. 6-10)

We created a novel design of flexible automobile chassis that allows vehicle to be lifted in elevation to track the elevation of the sun. The azimuth tracking of the sun is facilitated by the drive trains and the wheels as described earlier.

Prior effort at MIT (FIG. 6) created an inverted V flexible chassis that allows the passenger cabin to re-orient itself for two modes of vehicle operation: the driving mode with the lowered cabin position and the parking/cruising mode when the cabin is turned more upright either for a more upright driver or for saving parking space required.

One embodiment shown in FIG. 7 of our invention for the purpose of re-orienting the passenger cabin is facilitated by two perpendicular pairs of extendable poles [2111], [2112]. The passenger cabin [2113] comprises an oblong cylinder that rotates on the chassis by pivoting/hinging 2 points [2114], [2115] of the oblong cylinder onto the ends of 2 extension poles. Rotation of the ellipse is achieved by changing the length of two sides.

An early embodiment of the Monarch EV is shown in FIG. 8 with the oblong cabin [2113] built on the two perpendicular pairs of extendable poles [2111, 2112]. The sides [2114, 2115] and well as the top of the vehicle [2116] are embedded with flat solar panels. These solar panels track the sun in the elevation orientation by changing the lengths of both extendable pools [2111, 2112]. The azimuth orientation is changed by the steering and driving mechanisms of the vehicle.

The abstracted geometry of the Monarch EV is shown in FIG. 9 illustrating the trigonometry of the flexible chassis. Instead of changing the lengths of two sides of a triangle as shown in FIG. 7, we choose a simpler change of length x of the one side [2117] of a triangle. In the process of changing x, we change the elevation angle X [2118] for solar tracking. The length x is now the length of the back lift of the Monarch EV. The bottom of the triangle [2119] is now the base of the chassis with fixed length a. The top of the triangle [2120] is the top and forward flank of the vehicle, which is also of a fixed length b. The pivot [2121] allows the roof, hood [2120] and solar concentrator to track the elevation of the sun.

The actual frame of the Monarch EV implementing the varying geometry of FIG. 9 is shown in FIG. 10. The extendable lift [2117] now pushes the solar panels or concentrator out. The bottom of the vehicle [2119] is now fixed in length. The roof and the hood contour [2120] are also fixed in length while being pushed out at the pivot [2121] by the extendable lift [2117]. The lift is multiple sections of rails that extend the circumference of the back lift, very much like a extendable fishing pole, except instead of being straight sections, they are extended in circular sections. These sections move relative to each other by means of a motor turning a gear that moves each geared section of the lift.

Once the side panels are extended, the extendable lift [2117] is adjusted to track the sun for optimum system efficiency. A sun tracking unit conveys the sun elevation to an electronic controller, which in turns drives a motor [2122] connected to the lift [2117]. The motor is mounted and connected to a rack and pinion type gear system [2123], with the second set of gears attached on the lift [2117]. The motor drives the expandable lift [2117] up and down to track the elevation of the sun.

Concentrating Reflector and Solar Receiver Designs (FIGS. 11-15)

Parabolic mirrors are known to reflect rays of sun light onto a single focus, thereby serving the function of solar energy concentration. FIG. 11 shows a three dimensional Cartesian coordinate system (x, y, z) with z being the vertical dimension with sun directly overhead. The parabolic dish [3111] given by the equation $4pz=x^2+y^2$ [3112] has the focal point located at (0, 0, p) [3113] directly above the center of the mirror at (0, 0, 0) [3114]. A parabolic dish of radius r is given by (x, y, z) satisfying $4pz=x^2+y^2 \le r^2$ [3111]. As an example, we choose p=9 feet.

FIG. 12 show how the left wing [3135] and right wing [3136] are cut out from the single parabolic surface, thereby making the two wings have the same focal point. A flat surface at a level z<p collects light with the shape of the two wings scaled down. The center of the parabola is O [3114]. At the focal point z=p, the image of wings collapses to a single point. The left wing [3135] unfolds along the line AC, where A [3137] is the front pivot and C [3139] is the rear pivot for the opening. The right wing [3136] unfolds along the line BC, where B [3138] is the front pivot and C [3139} is the rear pivot.

We describe how to create two mirror wings out of a single parabolic surface. There is a single focal point for both mirrors. FIG. 13 shows both the top view [3145] and the side [3146] of a parabolic mirror.

Similar to FIG. 11, we consider in FIG. 13 a 3-dimensional Cartesian coordinate system (x, y, z) with z being the vertical dimension. We consider only a single parabolic dish given by the equation $4pz=x^2+y^2$ (with the focal point at (0, 0, p) directly above the center of the mirror at (0, 0, 0) which is marked as the point O [3114]). A parabolic dish of radius r is given by (x, y, z) satisfying $4pz=x^2+y^2 \le r^2$.

If we choose p=9 feet and r=7 feet for the parabolic dish, we have a top viewed area of $A=\pi r^2=154$ square feet. We may trim the area down to around 120 square feet such as that shown in FIG. 12. The following steps are executed for the trimming and folding.

First we determine as shown in FIG. 13 the three hinging points of the two side mirrors. The front end of the EV has width w feet. The two front hinging points A [3137] and B [3138] are on the circle satisfying $x^2+y^2 \le r^2$, e.g. the radius OA=r=6 feet. The points A and B are w feet apart as shown, and in our example the line AB has length w=6 feet. The back hinging point C [3139] is on the circle satisfying $x^2+y^2 \le s^2$, e.g. the radius OC has length s=8 feet. Note that the back hinge C is slightly higher than the front hinges A and B as s>r, as is evident in the side view of the parabola.

We now draw lines and ellipses on the top view [3145] as shown in FIG. 13. This is similar to creating lines on origami paper before trimming and folding the paper into a 3-dimensional origami figure. From the front end hinging points A and B, we create the crease lines AB and AC. These crease lines shall be folded. The triangle ABC forms the bottom of the EV. The parabola above AC forms the left side of the EV, while the parabola below BC forms the right side of the EV.

We now form the side above the crease line AC. Similar to the earlier design, the front forward part of the EV is defined by an ellipse through the points A, F, and D. The ellipse has a major axis of length 12 feet (the long diameter through the point D shown in FIG. 13) and a minor axis of length 4 feet (the short diameter through the point F shown). The major axis through the point D is inclined (as viewed from the top) 30 degrees with line AB. The formation of the side below the crease line BC follows the same process due to symmetry.

The sides of EV are folded upward along the lines AC and BC shown in FIG. 13 with the resulting folded structure to cover the sides of the Monarch EV. The mirrors are tilted until the end point of the minor axis for the two half ellipses (labeled F [3140] and G [3143]) are separated by a fixed distance on the top.

The bottom of the EV is now formed by cutting out the horizontal plane defined by the points A and B. Note that the horizontal plane is defined in the folded structure by the center line COH of FIG. 13. While the top of the EV is defined by two separate elliptical shapes, the back of the EV follows a single line defined by the intersection of the folded mirrors.

The top of the EV is formed by cutting out the top at a vertical height, say 6 feet from the bottom.

The result wings after these six steps, when unfolded, become the Monarch EV wings shown in FIG. 12.

Instead of forming the two sides out of a single parabolic surface, another embodiment involves forming each wing [3150] [3151] from a separate parabolic surface [3153] as shown in FIG. 14. The two parabolic wings have different focal points [3155] which could make solar tracking more complex.

FIG. 15 shows the top view of the wings [3160] [3161] and their corresponding focused images on the roof [3162][3163]. The concentration ratio is given by the ratio of the wing area divided by the roof top image area. At the roof top, the concentration is roughly 10 to 20 times, called low concentration. The concentrated solar power can be converted at around 20% efficiency into PV electricity using efficient crystalline silicon PV diodes. Thus the silicon surface area is reduced by this solar concentration ratio by 10 to 20 times.

A higher solar concentration of up to 1000 times is also considered for concentrated solar power (CSP) generation. This involves bringing the solar receiver further up and closer to the focal point, or by using parabolic mirrors with smaller focal distance. FIG. 16 shows the focused image on the roof at a distance of 6.6 feet from the center O [3143] (FIG. 12) of the parabolic dish shown in FIG. 13. The focal distance is chosen as 9 feet and hence the roof is at 2.5 feet from the focal point. The solar concentration ratio at the roof is given by the square of 9 divided by 2.5, or 13 times. If we bring the PV cells at a vertical distance of 4 inches from the focal point, the solar concentration ratio now becomes 729. The surface area of PV cells required is reduced by a factor of 729, and therefore more expensive high efficiency PV cells may be used. The much reduced focused image is shown in FIG. 15 in black [3164] [3165]. However the solar receiver now is a further 26 inch beyond the roof. In this case the solar receiver would be hidden under the roof and then a periscope mechanism may be used to lift the receiver to the desired distance from the focal point.

Energy Generator, Conversion, Storage, and Consumption Systems (FIG. 16-18)

The Monarch EV combines several energy functions of an electric vehicle and a photovoltaic system. The energy system of the Monarch EV includes energy storage in batteries [4101], energy generation of the solar system [4102] and regenerative breaking [4103], and energy consumption by the motor [4104], motor controller [4105] vehicle electrical components [4106], battery charging, and power output to external devices $DCV_{out}$ [4107] & $ACV_{out}$ [4108]. All these parts require a central conversion system to coordinate the overall energy system. (FIG. 16.) These general components can be seen in the Monarch EV in FIG. 17, in which the motor controller which can also act as an ACV out The energy storage of an electric vehicle is predominately batteries. Lithium iron phosphate is the main battery of choice for its stability and energy density. Other battery types are also used and new ones are constantly being developed. The batteries for the EV are also used as the initial power source for the PV system, providing the energy to initiate the tracking and movement of the PV system. Because Lithium type batteries require close monitoring to eliminate over-charging and under voltage conditions, a battery management system is typically employed to watch over the battery system. The BMS also helps maintain equal battery charge using cell balancing algorithms and circuitry. The BMS helps extend life of the battery system and also provide the user with maximum available battery charge.

The motor and controller of an EV powers both the locomotion of the EV, as well as the azimuth tracking, for the solar power generation. The controller runs off the energy stored in the batteries and supplies it to the motor in response to the throttle. The controller also accepts energy created during regenerative breaking while operating the EV. A main central power unit [4401] could include all the power system of an EV along with the power requirements of a self-standing power generator for household or portable use. (FIG. 18) This all-in-one unit would accept input from multiple AC and/or DC sources such as batteries [4402], solar generation [4403], grid power [4404], regenerative braking [4405], etc. Then have multiple AC and/or DC outputs at various voltages/types for motor [4406], battery charging [4407], grid-tie output [4408], 12V internal systems [4409], etc. This all-in-one power unit would be the electrical power backbone of the Monarch EV allowing it to be used for a multiple of energy needs. The batteries can alternatively be used to store the energy before converting to AC for grid-tie use cases.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

The invention claimed is:

1. A vehicle configured to collect energy from the sun, comprising;
   a plurality of wheels;
   a vehicle body configured to hold at least one passenger, the body including at least one upwardly facing solar energy receiving device comprising photovoltaic cells;
   a vehicle chassis supporting the vehicle body and comprising an adjustable frame supported upon the wheels, the vehicle chassis frame configured to be selectively elevated at one end of the chassis to adjustably orient the vehicle body and the solar energy receiving device with respect to the sun; and
   an adjustment mechanism configured to adjust the vehicle chassis frame so as to adjustably orient the solar energy receiving device with respect to the sun.

2. The vehicle as specified in claim 1 wherein the vehicle body has a plurality of panels, at least one said panel comprising the energy receiving device.

3. The vehicle as specified in claim 2 wherein the vehicle body has at least one side panel comprising the energy receiving device, the side panel configured to be selectively oriented with respect to the sun and adjust an efficiency of the energy receiving device.

4. The vehicle as specified in claim 3 wherein the side panel has a concave surface configured to face the sun.

5. The vehicle as specified in claim 4 wherein the concave surface is parabolic.

6. The vehicle as specified in claim 3 wherein the vehicle chassis has a pair of opposing side panels each comprising the energy receiving device, each said side panel being concave and configured to be selectively oriented and face the sun and adjust the efficiency of the energy receiving device.

7. The vehicle as specified in claim 6 wherein each said concave side panel has a reflective surface configured to direct received sunlight to the photovoltaic cells.

8. The vehicle as specified in claim 3 wherein the at least on side panel has photovoltaic cells configured to receive sunlight.

9. The vehicle as specified in claim 1 wherein the adjustable frame is generally configured as a triangle with a horizontally extending base member, an upwardly extending member coupled to the base member at an adjustment point, and a hypotenuse member coupled to and extending between the base member and the upwardly extending member and opposite the adjustment point.

10. The vehicle as specified in claim 9 wherein the adjustment mechanism is configured to adjust the length of the upwardly extending member.

11. The vehicle as specified in claim 10 wherein the vehicle chassis has at least one side panel comprising the energy receiving device, the side panel configured to be selectively oriented with respect to the sun and adjust the efficiency of solar energy collection.

12. The vehicle as specified in claim 11 wherein the side panel has a concave surface configured to face the sun.

13. The vehicle as specified in claim 12 wherein the concave surface is parabolic.

14. The vehicle as specified in claim 11 wherein the vehicle chassis has a pair of opposing side panels each comprising the energy receiving device, each said side panel being concave and configured to be selectively oriented and face the sun and adjust the efficiency of solar energy collection.

15. The vehicle as specified in claim 14 wherein a rear said wheel is disposed proximate the adjustment point, and at least one front said wheel is disposed proximate where the base member and the hypotenuse member are coupled such that the vehicle can be rotated in a circle about a point proximate the front wheel.

16. The vehicle as specified in claim 15 comprising a pair of front said wheels with an axle therebetween, wherein the vehicle is configured to be rotated in a circle about one of the front wheels or at a point along the axle.

17. The vehicle as specified in claim 14 wherein the opposing side panels are configured to be unfolded downwardly from the hypotenuse member.

18. The vehicle as specified in claim 6 wherein each said side panel is parabolic and is focused at a different focal point.

19. The vehicle as specified in claim 6 wherein one said side panel abuts the other said side panel to form a single parabolic surface having a single focal point.

20. The vehicle as specified in claim 7 wherein the vehicle has a roof panel, wherein the photovoltaic cells are positioned above the roof.

21. The vehicle as specified in claim 6 wherein the vehicle has a roof panel with an underside configured with photovoltaic cells configured to receive energy from the sun.

22. The vehicle as specified in claim 10 wherein the adjustment mechanism is configured to adjust the length of the horizontally extending base member.

* * * * *